US009441717B2

(12) United States Patent
Smetana

(10) Patent No.: US 9,441,717 B2
(45) Date of Patent: *Sep. 13, 2016

(54) MOUNTING CONCEPT FOR AN ELECTRIC AXLE

(71) Applicant: Schaeffler Technologies GmbH & Co. KG, Herzogenaurach (DE)

(72) Inventor: Tomas Smetana, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 4 days.

This patent is subject to a terminal disclaimer.

(21) Appl. No.: 14/406,505

(22) PCT Filed: Jul. 10, 2013

(86) PCT No.: PCT/DE2013/200039
§ 371 (c)(1),
(2) Date: Dec. 8, 2014

(87) PCT Pub. No.: WO2014/008897
PCT Pub. Date: Jan. 16, 2014

(65) Prior Publication Data
US 2015/0152947 A1 Jun. 4, 2015

(30) Foreign Application Priority Data

Jul. 13, 2012 (DE) .................. 10 2012 212 270

(51) Int. Cl.
*F16H 3/72* (2006.01)
*F16H 37/08* (2006.01)
(Continued)

(52) U.S. Cl.
CPC ............... *F16H 37/082* (2013.01); *B60K 1/00* (2013.01); *B60K 1/02* (2013.01); *F16H 48/10* (2013.01);
(Continued)

(58) Field of Classification Search
CPC ...... F16H 37/082; F16H 48/10; F16H 48/36; F16H 2048/405; F16H 2057/02034; F16H 2063/3063; F16H 2048/364; B60K 1/02; B60K 1/00; B60K 2001/001; B60Y 2400/804; B60Y 2300/82
See application file for complete search history.

(56) References Cited

U.S. PATENT DOCUMENTS 5,443,130 A * 8/1995 Tanaka ..................... B60K 1/00
180/65.6
5,845,732 A * 12/1998 Taniguchi ................ B60K 1/00
180/65.6
(Continued)

FOREIGN PATENT DOCUMENTS

DE 4042174 7/1992
DE 102010036884 A1 2/2012
(Continued)

*Primary Examiner* — David J Hlavka
(74) *Attorney, Agent, or Firm* — Davidson, Davidson & Kappel, LLC

(57) ABSTRACT

An axle drive system includes a first dynamoelectric drive motor having a first rotor shaft radially mounted on a housing at two bearing points; a superimposing transmission and a power divider having a first power divider shaft driving a first output shaft, and having a second power divider shaft driving a second output shaft; the power divider shafts, the output shafts and the first rotor shaft rotationally mounted about a common axis of rotation oriented transversely to the direction of travel. A transmission input shaft is connected to the first rotor shaft for co-rotation therewith; at one end facing the first rotor shaft, the transmission input shaft is radially mounted on the housing at a further bearing point; the first rotor shaft and the transmission input shaft are intercoupled axially displaceably; the first and the second output shafts are each mounted relative to the housing by a radial bearing and relative to each other by another radial bearing.

10 Claims, 1 Drawing Sheet

(51) Int. Cl.
*B60K 1/00* (2006.01)
*B60K 1/02* (2006.01)
*F16H 48/10* (2012.01)
*F16H 57/02* (2012.01)
*F16H 48/36* (2012.01)
*F16H 48/40* (2012.01)
*F16H 63/30* (2006.01)

(52) U.S. Cl.
CPC ......... *F16H 48/36* (2013.01); *B60K 2001/001* (2013.01); *B60Y 2300/82* (2013.01); *B60Y 2400/804* (2013.01); *F16H 2048/364* (2013.01); *F16H 2048/405* (2013.01); *F16H 2057/02034* (2013.01); *F16H 2063/3063* (2013.01)

(56) References Cited

U.S. PATENT DOCUMENTS

| | | | | |
|---|---|---|---|---|
| 6,378,638 | B1 * | 4/2002 | Mizon | B60K 6/26 180/65.25 |
| 6,484,834 | B2 * | 11/2002 | Bowen | B60K 6/365 180/65.25 |
| 6,540,636 | B2 * | 4/2003 | Amanuma | B60K 6/36 180/65.25 |
| 7,384,357 | B2 * | 6/2008 | Thomas | B60K 17/356 180/247 |
| 8,672,790 | B2 * | 3/2014 | Severinsson | F16H 48/30 475/150 |
| 2006/0081406 | A1 * | 4/2006 | Kano | B60K 6/365 180/65.6 |
| 2006/0289228 | A1 * | 12/2006 | Sharma | B60K 17/3462 180/433 |
| 2006/0293141 | A1 * | 12/2006 | Sharma | B60K 23/04 475/204 |
| 2009/0182474 | A1 * | 7/2009 | Ross | B60K 6/52 701/53 |
| 2012/0031691 | A1 | 2/2012 | Fuechtner | |
| 2013/0172142 | A1 * | 7/2013 | Smetana | F16H 48/11 475/149 |

FOREIGN PATENT DOCUMENTS

| | | |
|---|---|---|
| DE | 10 2010 036241 | 3/2012 |
| JP | 8 048 164 | 2/1996 |
| KR | 2009 00 44 805 | 5/2009 |
| WO | WO 2012084304 | 6/2012 |

* cited by examiner

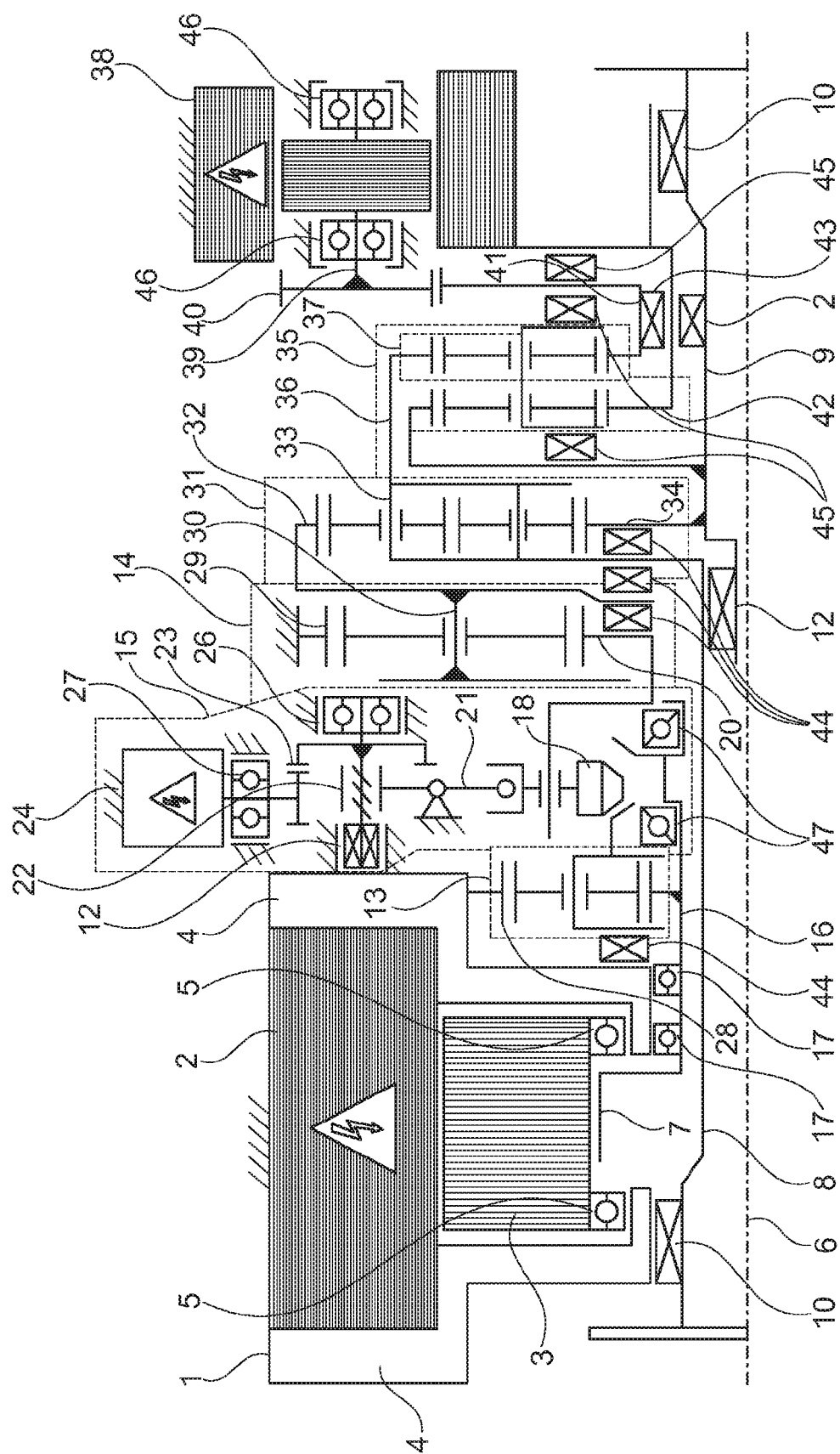

MOUNTING CONCEPT FOR AN ELECTRIC AXLE

The present invention relates to an axle drive system for a motor vehicle. Such an axle drive system is used, for example, in electrically powered vehicles or in hybrid vehicles. The axle drive systems of the aforementioned type are characterized by a coaxial configuration of a dynamoelectric drive motor provided for electric propulsion, a superimposing transmission that reduces rotational speed, and a power divider for distributing the torque generated by the drive motor to the output shafts. In an axle drive system of the above-mentioned type, the aforesaid three components have a common axis of rotation that is oriented transversely to the direction of travel of the motor vehicle.

BACKGROUND

An axle drive system for a motor vehicle having the features set forth in the definition of the species in claim 1 is generally known from the German Patent Application DE 102010036884 A1. The coaxial design of the axle drive system and the nested configuration of the output shafts in the rotor shaft configured as a hollow shaft allow the electric drive to be realized in the smallest possible space.

The output shafts coupled to the wheels are subject to enormous mechanical loads during travel. On the other hand, the rotor of the electric traction motor, as well as the input-side components of the superimposing transmission rotate at very high speeds of up to 16,000 revolutions/min. In addition, a very precise mounting of the aforesaid high-speed components is required. Mentioned here exemplarily is the electromagnetically active air gap in the dynamoelectric machine that is dimensioned to be as small as possible to achieve a greatest possible efficiency. Therefore, it is important to ensure that vibrations excited during vehicle operation do not lead to collision of the stator and the rotor within the dynamoelectric machine.

SUMMARY OF THE INVENTION

It is an object of the present invention to provide a rugged and space-saving electric drive system for powering a motor vehicle.

The present invention provides an axle drive system including a first dynamoelectric machine having a first rotor shaft that is radially mounted on a housing of the axle drive system at two bearing points. The first dynamoelectric machine is used for generating a driving torque for the motor vehicle axle driven by the axle drive.

In addition, the drive system according to the present invention includes a superimposing transmission and a power divider having a first power divider shaft that drives a first output shaft, and has a second power divider shaft that drives a second output shaft. The aforesaid power divider makes possible different rotational speeds on the left and right output sides, as is known from conventional differential gears.

The axle drive system according to the present invention is characterized by a coaxial design. This means that the power divider shafts, the output shafts, and the first rotor shaft are rotationally mounted about a common axis of rotation that is oriented transversely to the vehicle driving direction.

The axle drive system according to the present invention may be used both for driving a front axle of a motor vehicle, as well as for driving a rear axle. It is also conceivable to equip a motor vehicle with two such axle drive systems, one of which is the rear axle, and the other the front axle.

The exceptional feature of the axle drive system resides in the mounting concept that makes possible a vibrational decoupling among the output shafts, the transmission shafts, and the rotor shaft. This decoupling succeeds in accordance with the present invention in that the superimposing transmission has a transmission input shaft that is connected to the rotor shaft for co-rotation therewith; at one end facing the first rotor shaft, the transmission input shaft is radially mounted on the housing at at least one further bearing point; the first rotor shaft and the transmission input shaft are intercoupled axially displaceably; and the first and the second output shafts are each mounted relative to the housing by a radial bearing and relative to each other by another radial bearing.

Since the output shafts are directly mounted relative to the housing of the axle drive system, and, in addition, the two output shafts are mounted relative to each other by the further radial bearing, they are vibrationally decoupled both from the superimposing transmission, as well as from the first dynamoelectric drive motor. Accordingly, vibrations acting on the output shafts do not propagate into the rapidly rotating transmission parts, nor into the traction motor that typically operates at a high speed. To mount the two output shafts relative to each other, a needle bearing may be used, or, due to the low speed differential of the two output shafts, a plain bearing as well.

To begin with, the ruggedness of the drive system is ensured because neither of the output shafts contacts the rotor shaft or any one of the transmission assemblies at any location. Also, the fact that the transmission input shaft is additionally vibrationally decoupled from the rotor shaft contributes to the mechanical resistance of the system. This decoupling is achieved in that the two shafts are first intercoupled axially displaceably, for example with the aid of a spline toothing. This decoupling is further achieved in that the end of the transmission input shaft facing the rotor shaft is radially supported separately at the further bearing point on the housing. Accordingly, the rotor shaft is decoupled both from the transmission input shaft, as well as from the output shafts. Therefore, the mounting concept according to the present invention makes possible the highly precise mounting of the rotor, while maintaining a small air gap, even under strong mechanical excitations of the output shafts.

One advantageous embodiment of the present invention provides that the first rotor shaft be mounted via two rolling element bearings having a rotating outer ring and a stationary inner ring. This ensures a space-saving configuration and ease of mounting. In addition, when a rotating outer ring is used, a low seal friction is obtained at a high speed. Moreover, balancing of the rotor is still possible, even in the pre-mounted state.

Grooved ball bearings are advantageously used as rolling element bearings for mounting the rotor shaft.

Within the housing of the axle drive, one advantageous embodiment of the present invention provides that the superimposing transmission be separated from the first drive motor by an end shield, the end shield having one of the bearing points for mounting the rotor shaft, and the other bearing point being configured on the side facing the superimposing transmission for mounting the transmission input shaft on the end shield. Thus, on the one side, the end shield holds in place one of the radial bearings designed, in particular, as rolling element bearings, for mounting the rotor shaft and, on the other side, the radial bearing, for mounting the transmission input shaft.

In a further advantageous embodiment of the present invention, a two-speed gearing of the axle drive system is achieved in that the superimposing transmission has a first and a second planetary gear set; the second planetary gear set has an output shaft that is coupled to an input shaft of the power divider for co-rotation therewith; the axle drive system has a shift actuator system which enables the transmission input shaft to be optionally directly operatively connected to the second planetary gear set or indirectly via the first planetary gear set to the second planetary gear set; and a planetary carrier of the first planetary gear set and a sun gear of the second planetary gear set being mounted in radial relation to the transmission input shaft.

In this case, a first and a second angular contact ball bearing are advantageously used for radially mounting the planetary carrier and the sun gear. The two angular contact ball bearings are axially preloaded. A ring gear of the first planetary gear set may be floating mounted relative to the housing of the axle drive system, for example via a spline toothing. On the other hand, a ring gear of the second planetary gear set of the superimposing transmission may be precisely radially guided in the part of the axle drive housing that is associated with the transmission. In this case, the carrier of the second planetary gear set expediently floats into position.

Another advantageous embodiment of the present invention provides that the axle drive system also include a torque vectoring unit for selectively distributing a torque, which is introduced by the first drive motor, among the output shafts. The aforesaid torque vectoring unit has a second drive motor and a planetary gear unit having a third and fourth planetary gear set. In this specific embodiment, a sun gear of the third planetary gear set is fixedly connected to the housing, while a sun gear of the fourth planetary gear set is rotationally and radially mounted on the stationary sun shaft of the third planetary gear set. For example, a radial needle bearing may be used to brace the movable sun against the stationary sun.

The power divider of the axle drive system is advantageously configured as a planetary differential, a planetary carrier of the planetary differential being connected to the first output shaft for co-rotation therewith, and a sun gear of the planetary differential being connected to the second output shaft for co-rotation therewith; and the second drive motor being operatively engaged via a spur gear stage with the sun gear of the fourth planetary gear set; and a ring gear of the fourth planetary gear set being connected to the planetary carrier of the planetary differential for co-rotation therewith. The aforesaid spur gear stage steps down the speed of the second drive motor, thereby making possible a compact enough realization of the same. The radial bracing of the output sun and of the output carrier of the planetary differential is assumed by the sun, and that of the output carrier of the planetary differential by the output shafts of the axle drive system.

The second drive motor is advantageously configured with a second rotor shaft that is oriented in parallel to the axis of the first rotor shaft of the first drive motor, the second rotor shaft being mounted by two axially preloaded rolling-contact bearings, in particular grooved ball bearings. In this case, the aforesaid grooved ball bearings are arranged in a conventional configuration, in particular, i.e., including rotating inner rings and stationary outer rings, and pressed into a housing of the second drive motor. The aforesaid housing of the second drive motor is advantageously accommodated within the housing of the complete axle drive system.

Another advantageous embodiment of the present invention is characterized in that the entire transmission unit, including the superimposing transmission, the power divider, and the planetary gear unit of the torque vectoring unit, is axially preloaded by axial bearings that all have the same pitch circle; considered axially, the aforesaid transmission unit being clamped between the first and the second drive motor. Thus, a compact design is derived for the complete axle drive unit, where the transmission components, an advantageously present switchable coupling and the actuator system thereof are configured between the first and second drive motor and are clamped there. Needle bearings are used, for example, for the axial mounting. In one advantageous embodiment, they are all configured on the same pitch circle, thereby allowing tilting moments within the axle drive system to be absorbed very effectively.

BRIEF DESCRIPTION OF THE DRAWING

The present invention is clarified in greater detail in the following on the basis of the exemplary embodiment illustrated in the FIGURE.

The FIGURE shows a specific embodiment of an axle drive system including a schematic representation of the bearing points.

DETAILED DESCRIPTION

The figure shows a specific embodiment of an axle drive system along the lines of the present invention, including a schematic representation of the bearing points. To begin with, the axle drive system includes a first dynamoelectric drive motor 1 that applies the torque for driving a motor vehicle axle. First drive motor 1 includes an external stator 2 that is spaced apart from an internal rotor 3 by an air gap. Stator 2 and rotor 3 are accommodated in a machine housing, whose end shields 4, which abut on the end faces of the machine, are discernible in the FIGURE. The rotor of first drive motor 1 is braced radially against end shields 4 via two grooved ball bearings 5.

In this case, the mounting is such that the outer ring of grooved ball bearing 5 rotates together with rotor 3 about axis of rotation 6, while the inner ring of grooved ball bearing 5 is stationary in each case. Rotor 3 includes a rotor laminated core that is shrunk-fit onto first rotor shaft 7 configured as a hollow shaft. Guided within this first rotor shaft 7 are a first and a second output shaft 8, 9, whose common axis of rotation 6 coincides with the axis of rotation of first rotor shaft 7. The first, longer output axle 8 is braced by a radial needle bearing 10 against left end shield 4 of first drive motor 1, while second, shorter output axle 9 is radially braced via another radial needle bearing 11 against the housing of a transmission of the axle drive system. In addition, the two output axles 8, 9 are radially mounted relative to one another via a plain bearing 12.

Accordingly, output shafts 8, 9 are supported merely on the housing components and between each other. At no location do output shafts 8, 9 contact first rotor shaft 7 or the high-speed transmission components (which are still to be clarified), so that even vibrations introduced into output shafts 8, 9 are prevented from being transmitted into the high-speed components of the axle drive system. Configured to the right of and connected downstream of first dynamo-electric drive motor 1 are a first and second planetary gear set 13, 14 of a superimposing transmission, as well as a shift actuator system 15 that may be used for selecting between two gears and a neutral position.

The superimposing transmission is used for stepping down the speed introduced by first drive motor 1 into a transmission input shaft 16. The torque is transmitted by rotor 3 to the transmission via a spline toothing between rotor shaft 7 and transmission input shaft 16; first rotor shaft 7 and transmission input shaft 16 being intercoupled axially displaceably via the spline toothing. High-speed transmission input shaft 16 is radially mounted in end shield 4 facing the transmission via ball bearings 17. The described type of mounting of first rotor shaft 7 and of transmission input shaft 16 makes possible a decoupling of the vibrations between first dynamoelectric machine 1 and the transmission.

Together with shift actuator system 15, the superimposing transmission forms a two-speed transmission, it being possible for the particular gears to be selected by axial displacement of a shifting sleeve 18 of shift actuator system 15. In a first gear, the coupling body of shifting sleeve 18 is in gear engagement with planet carrier 19 of first planetary gear set 13, while, in a second gear, transmission input shaft 16 is directly connected to a sun gear 20 of second gear stage 14. To engage the gears, the coupling body of shifting sleeve 18 is positively connected to sun gear 20 of second planetary gear set 14 by an axially displaceable splined shaft toothing. The axial movement of shifting sleeve 18 is actuated by a rocker arm 21. The sliding blocks of shifting sleeve 18 engage into a circumferential groove on the outer diameter of shifting sleeve 18.

The pivoting movement of rocker 21 is executed by a ball-screw drive 22 having a spindle, the spindle being driven via a crown toothing 23 by another electric motor 24 that is configured orthogonally to axis of rotation 16. The spindle of ball-screw drive 22 is mounted via a radial needle bearing 25 and ball bearing 26, while the rotor shaft of further electric motor 24 is radially mounted with the aid of grooved ball bearings 27. Transmission input shaft 16 is used for radially guiding planet carrier 19 of first planetary gear set 13, as well as for radially guiding sun gear 20 of second planetary gear set 14. Preloaded angular contact ball bearings 47, 48 are used in this case for radial guides. Ring gear 28 of first planetary gear set 13 is floating mounted relative to the transmission housing via a spline toothing. Ring gear 29 of second planetary gear set 17 is precisely radially guided in the transmission housing. On the other hand, planet carrier 30 of second planetary gear set 14 floats into position.

Connected downstream of the superimposing transition having first and second planetary gear sets 13, 14 and shift actuator system 15 is a power divider 31 in the form of a spur-gear differential. Ring gear 32 of power divider 31 is connected to planetary carrier 30 of second planetary gear set 14 for co-rotation therewith. On the other hand, planetary carrier 33 of spur-gear differential is braced against first output shaft 8. Output sun 34 of the spur-gear differential is radially braced against second output shaft 9.

In addition, the axle drive system also includes a torque vectoring unit having a planetary gear unit 35 that includes a third and fourth planetary gear set 36, 37, as well as a second drive motor 38 whose second rotor shaft 39 drives a spur gear stage 40 that is operatively connected to a rotationally movable sun gear 41 of fourth planetary gear set 37. On the other hand, sun gear 42 of the third planetary gear set is connected to the housing of the axle drive unit for co-rotation therewith. Sun gear 41 of the fourth planetary gear set is braced via a radial needle bearing 43 against stationary sun gear 42 of the third planetary gear set.

The complete transmission including the superimposing transmission having first and second planetary gear set 13, 14 and shift actuator system 15, power divider 31, and planetary gear unit 36 is axially preloaded. Axial needle bearings 44, 45 are used for the axial bracing. Axial needle bearings 45 configured in the area of planetary gear unit 35 are all disposed on the same pitch circle, thereby avoiding tilting. In the same way, axial bearings 44 disposed between end shield 4 of first drive motor 1 and the spur-gear differential are located on the same pitch circle. It is also conceivable and within the scope of the present invention that all axial needle bearings 44, 45 are configured on the same pitch circle.

Further grooved ball bearings 46 are used for mounting second rotor shaft 39 of second drive motor 38 that is provided for selectively distributing the torque, that is generated by first drive motor 1, between the two output shafts 8, 9. In contrast to grooved ball bearings 5 for mounting first rotor shaft 7 of first drive motor 1, further grooved ball bearings 46 are pressed by rotating inner ring and stationary outer ring into the gear transmission housing, respectively torque vectoring motor housing. Grooved ball bearings 46 are axially preloaded because of the required freedom from play. This is derived from the accuracy requirements for drive motor 38 which acts as a torque vectoring motor controller.

LIST OF REFERENCE NUMERALS 1 first dynamoelectric drive motor
2 stator
3 rotor
4 end shield
5, 27, 46 grooved ball bearing
6 axis of rotation
7 first rotor shaft
8 first output shaft
9 second output shaft
10, 11, 25, 43 radial needle bearing
12 plain bearing
13 first planetary gear set
14 second planetary gear set
15 shift actuator system
16 transmission input shaft
17, 26 ball bearing
18 shifting sleeve
19 planetary carrier of the first planetary gear set
20 sun gear of the second planetary gear set
21 rocker
22 ball-screw drive
23 crown toothing
24 third drive motor
28 ring gear of the first planetary gear set
29 ring gear of the second planetary gear set
30 planetary carrier of the second planetary gear set
31 power divider
32 ring gear of the power divider
33 planetary carrier of the power divider
34 output sun of the power divider
35 planetary gear unit
36 third planetary gear set
37 fourth planetary gear set
38 second drive motor
39 second rotor shaft
40 spur gear stage 41 sun gear of the fourth planetary gear set
42 sun gear of the third planetary gear set
44, 45 axial needle bearing
47, 48 angular contact ball bearing

What is claimed is:

1. An axle drive system for a motor vehicle comprising:
   a first dynamoelectric drive motor having a first rotor shaft radially mounted on a housing of the axle drive system at two bearing points;
   a superimposing transmission; and
   a power divider having a first power divider shaft driving a first output shaft and having a second power divider shaft driving a second output shaft;
   the first and second power divider shafts, the first and second output shafts and the first rotor shaft being rotationally mounted about a common axis of rotation oriented transversely to a direction of travel of the motor vehicle;
   the superimposing transmission having a transmission input shaft connected to the first rotor shaft for co-rotation therewith;
   at one end facing the first rotor shaft, the transmission input shaft is radially mounted on the housing least at one further bearing point;
   the first rotor shaft and the transmission input shaft being intercoupled axially displaceably; and
   the first and the second output shafts each mounted relative to the housing by a radial bearing and relative to each other by another radial bearing.

2. The axle drive system as recited in claim 1 wherein the two bearing points include two rolling element bearings having a rotating outer ring and a stationary inner ring.

3. The axle drive system as recited in claim 1 wherein within the housing, the superimposing transmission is separated from first drive motor by an end shield; the end shield having one of the two bearing points for mounting the rotor shaft; and, to mount the transmission input shaft on the end shield, the further bearing point being configured on the side facing the superimposing transmission.

4. The axle drive system as recited in claim 1 wherein the superimposing transmission includes a first and a second planetary gear set; the second planetary gear set having an other output shaft coupled to an input shaft of the power divider for co-rotation therewith; and further comprising a shift actuator system enabling the transmission input shaft to be alternately directly operatively connected to the second planetary gear set or indirectly via the first planetary gear set to the second planetary gear set; and a planetary carrier of the first planetary gear set and a sun gear of the second planetary gear set being mounted in radial relation to the transmission input shaft.

5. The axle drive system as recited in claim 4 further comprising a first angular contact ball bearing for radially mounting the planet carrier and a second angular contact ball bearing for radially mounting the sun gear, both first and second angular contact ball bearings being axially preloaded.

6. The axle drive system as recited in claim 1 further comprising a torque vectoring unit for selectively distributing a torque introduced by the first drive motor between the first and second output shafts; the torque vectoring unit having a second drive motor and a planetary gear unit having a third and fourth planetary gear set; a sun gear of the third planetary gear set being fixedly connected to the housing; and a sun gear of the fourth planetary gear set being rotationally and radially mounted on the stationary sun shaft of the third planetary gear set.

7. The axle drive system as recited in claim 6 wherein the power divider is configured as a planetary differential; a planetary carrier of the planetary differential being connected to the first output shaft for co-rotation therewith, and a sun gear of the planetary differential being connected to the second output shaft for co-rotation therewith; and the second drive motor being operatively engaged via a spur gear stage with the sun gear of the fourth planetary gear set; and a ring gear of the fourth planetary gear set being connected to the planetary carrier of the planetary differential for co-rotation therewith.

8. The axle drive system as recited in claim 7 wherein the second drive motor has a second rotor shaft oriented in parallel to the axis of the first rotor shaft of the first drive motor; the second rotor shaft being mounted by two axially preloaded rolling-contact bearings.

9. The axle drive system as recited in claim 8 wherein the rolling-contact bearings are grooved ball bearings.

10. The axle drive system as recited in claim 7 wherein an entirety of a transmission unit defined by the superimposing transmission, the power divider, and the planetary gear unit of the torque vectoring unit is axially preloaded by axial bearings having a same pitch circle; considered axially, the transmission unit being clamped between the first and the second drive motor.

* * * * *